Patented Oct. 10, 1939

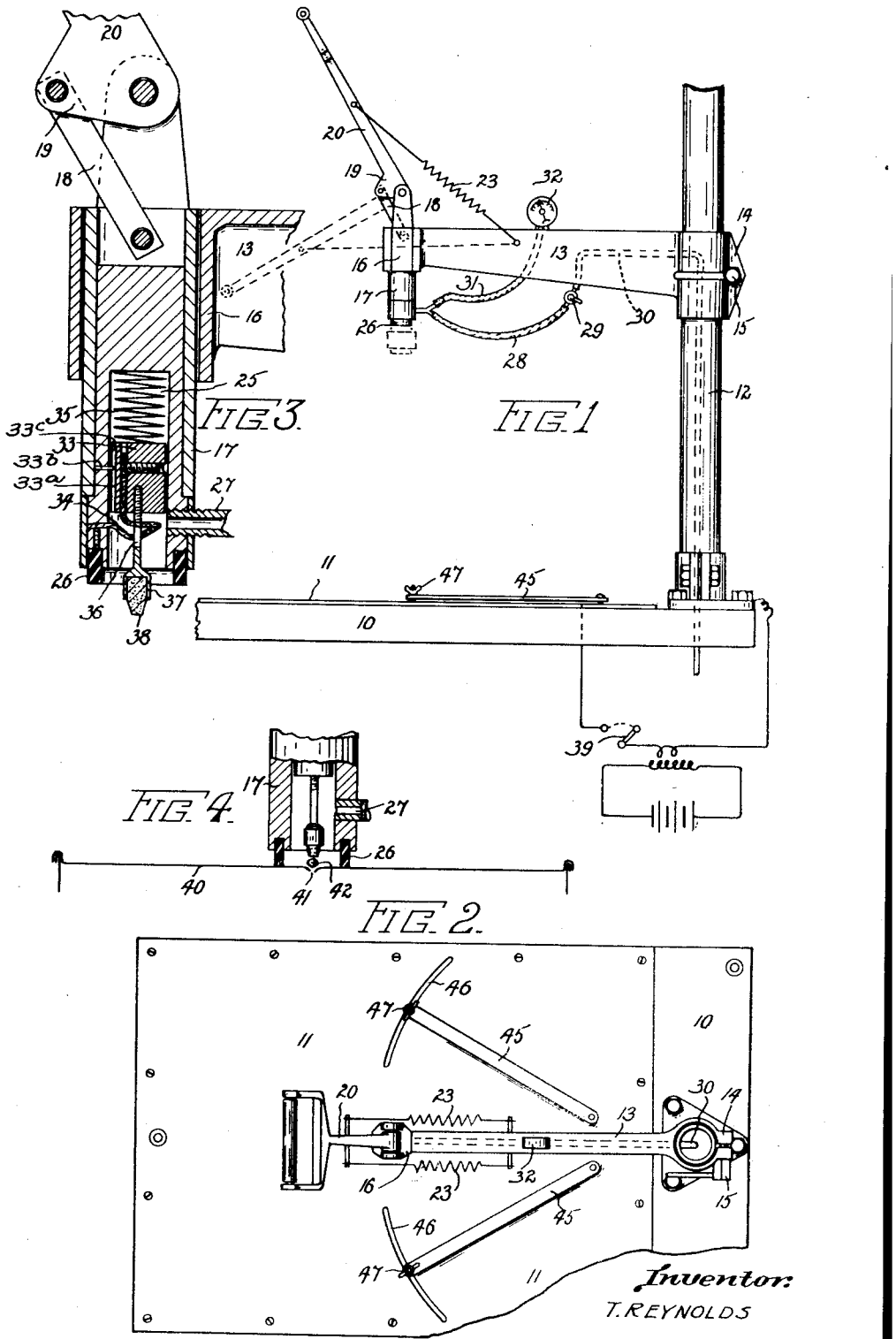

2,175,314

UNITED STATES PATENT OFFICE 2,175,314

MEANS FOR VACUUM-SEALING CONTAINERS

Thomas Reynolds, Palmerston North, Wellington, New Zealand

Application April 16, 1937, Serial No. 137,381
In New Zealand July 20, 1936

1 Claim. (Cl. 113—82)

This invention has reference to the known method of packing perishable foods in which the foods are placed in airtight containers and the air exhausted therefrom and the containers hermetically sealed so that the contents are kept under vacuum conditions until the containers are opened.

The invention has been devised with the object of providing improved means whereby the air may be exhausted from a container and the container then sealed to maintain the vacuum conditions thus created within it.

The means devised are of a nature such as to allow for the packed and closed container having the air drawn out through a small aperture made in its top or wall, and while being held under the conditions thus obtained, having the aperture closed and sealed by a soldering operation carried out electrically.

The invention involves the use of metallic containers, and comprises the combination with a platform or support for such a container, made to form one electrode of an electric circuit, of a nozzle forming device adapted to fit over an aperture in the container and connected with an air suction source, such device having embodied therewith a carbon electrode connected with the other pole of the electric circuit. Such nozzle device is made to enclose an aperture in the container with a hermetic seal and to position the carbon electrode over a lump of solder previously placed on the aperture, to retain it with a spring pressure that will yield to permit of the air being drawn out from the container. Then on electric current being caused to pass through the solder, the solder will melt and close the aperture.

The approved manner of giving effect to the invention is illustrated in the accompanying drawing, in which:

Figure 1 is a side elevation of the complete apparatus.

Figure 2 is a plan thereof.

Figure 3 is an enlarged sectional elevation of the suction nozzle and its adjuncts, forming part of such apparatus.

Figure 4 is a diagram illustrating the operation of the apparatus.

In giving effect to the invention, a suitable base 10 is provided and upon such is fixed a metallic plate 11 covering the main part of its area and suitably electrically insulated therefrom. This plate has one pole of an electric supply circuit, as indicated by the diagram in Figure 1, connected thereto, to constitute one electrode of such circuit.

Affixed to the rear of the base 10 is a vertical standard 12 and on such a horizontal arm 13 is mounted to extend in above the base. This arm is adjustable in its height on the standard, and also laterally above the base, by being mounted to slide and swing on the standard, but is designed to be locked rigidly at any adjusted position, as by forming its inner end as a split boss 14 to fit on the standard and providing the boss edges with a pinch screw 15 to close the boss upon the standard.

The outer end of the arm 13 is formed as a vertical slide guide 16 and in such is mounted a plunger 17 so that it may slide up and down therein. This plunger is designed to be moved up and down by the connection of its upper end, by means of the link 18, with the shorter arm 19 of a bell crank lever 20 that is journalled in brackets 21 projecting up from the guide top, so that by raising and lowering the longer arm 22 of the bell crank lever, the plunger will be lifted or lowered in its guide. The lever is, however, so controlled that it is automatically retained in either its raised or its lowered position and is carried to each extreme of its movement when moved past the midway position, by the use of springs combined therewith. These springs, which are shown at 23, are of helical nature and are stretched between the member 22 of the lever and the horizontal arm 13 at approved distances from the pivot of the lever. The tension of the springs is so adjusted as to draw the lever up, or down, in relation to the medial position and thereby to keep it in either of these positions as it is moved from one to the other.

The plunger 17 is formed with a central bore or chamber 25 at its lower end and is provided at such end with a rubber ring 26 projecting therefrom and surrounding the mouth of the bore. Entering the side of this bore is a nipple 27 to which a flexible tube 28 is connected that leads through a cock 29 mounted on the arm 13, to a pipe 30 which is carried along the arm and down through the standard 12 to connect with any approved source of vacuum suction, as for instance a chamber in which a vacuum is maintained by an exhausting pump, at any required degree. Also from this nipple 27 a second flexible tube 31 is caused to branch and such is connected with a vacuum gauge 32 mounted on the arm and which will indicate the vacuum conditions prevailing in the bore 25 in the circumstances hereinafter described.

Fitted into the bore 25 is a metallic block 33 which is capable of sliding up and down in the bore but may be suitably held from rotation therein. This block is arranged in definite electric connection with the plunger 17 into which it is fitted, as for instance by means of the flexible copper wire connection 34 which also permits of the block moving in the bore. A cushion spring 35 is placed between the block top and the bore top and serves to force the block normally downward in the bore. Block 33 is provided with a groove 33a extending axially thereof into which pin 33b extends to engage shoulder 33c and limit the downward movement of block 30 under the action of spring 35. Affixed to the bottom of the block 33, at its centre, is a metallic pin 36 which is screwed into the block and which pin at its bottom is made with a cup 37 into which a carbon block 38 is secured to project downward. The normal position of the block 33 is such as to cause this carbon to extend a distance out from the plunger bottom.

The standard 12 is electrically insulated from the base 10 and to it the second pole of the electric circuit is secured, as indicated in the diagram in Figure 1. The standard 12, arm 13, plunger 17, block 33 and pin 36 are one electrically so that the carbon 38 constitutes one electrode of a circuit, the other electrode of which is the metallic plate 11. Thus when metallic contact between these is made, the circuit is capable of being closed through the operation of a switch 39 interposed therein.

In the operation of this apparatus it is intended to be used in respect of a metallic container that is closed and in the closed top 40 (Figure 4) of which a small aperture 41 is made and in respect of the height of which container the arm 13 is adjusted in its position upon the standard 12. Such container, with a small pellet 42 of a suitable solder resting over the aperture, is placed on the plate 11 and the plunger 17 lowered to cause the rubber ring 26 to engage the container top around the aperture, making a hermetic seal therewith by reason of the tension of the springs 23 which in the adjustment of the arm 13 are caused to exercise a pull on the plunger actuating lever which will force the plunger down on to the container and retain it there. At the same time the carbon electrode 38 engages upon the solder pellet 42 with a springy pressure caused by the spring 35. The vacuum control cock 29 is then opened to cause the air to be exhausted from the container through this aperture 41, the spring pressure upon the electrode being such as to permit of the solder pellet lifting to allow the air to be drawn out, and the connection maintained until the vacuum conditions in the container reach the degree required, which is ascertained by closing the cock, when the gauge 32 will indicate the conditions. When such has been effected, and connection with vacuum shut off the control switch 39 is closed, and the electric circuit which has been established through the solder pellet and container, is completed, to thereby cause the melting of the pellet and the sealing of the aperture through the pressure upon the carbon electrode caused by the spring 35.

The solder material used is one that melts at a low temperature and thus the period during which the current acts is very short and the resultant cooling of the solder, after melting, is rapid. Consequently the plunger may be lifted clear of the container almost immediately.

Means are provided upon the plate 11 to allow of the correct positioning of the containers thereon with respect to the plunger 17 in order that it shall descend over the aperture in the top of the container placed upon the plate at each operation. These means are intended to be used in respect of containers in each of which the aperture is pierced at a standardized position in respect of the top area thereof. They comprise two strips 45, of flat material, that are laid on the surface of the plate, each strip having one end pivotally fastened to the plate, on opposite sides of the centre line thereof and close in to the base of the standard 12. These strips then diverge outwardly from each other across the surface and each has its end fastened in a slot 46, curving in an arc the centre of which is the strip pivot, by means of a thumb nut 47. The strips may thus be moved to and fixed at different angles of divergence, so that a container may be positioned relatively to the plunger above, by causing it to enter between the strips and pressing it into the angle formed by the strips until its sides engage such strips. Different sized containers may thus be allowed for by the adjustment of the strips at the angle necessary to receive and engage them to position their apertures accurately vertical beneath the centre of the plunger.

I claim:

Means for the purposes herein described, comprising the combination with a switch controlled electric power circuit and with a vacuum creating source, of a metallic platform connected with one pole of such power circuit, a standard, a vertically disposed guide carried by said standard arranged above such platform, a vertical plunger rod formed with a hollow lower end disposed in such guide and having means for moving it up and down therein, a nipple opening from the side of the plunger bottom and connected with said vacuum creating source, a block fitted to slide in the hollow of the plunger and spring cushioned therein, a carbon holder affixed to the bottom of the block and projecting downward therefrom, electric connections between the carbon holder and the second pole of said electric circuit, means for raising and lowering the said plunger in its guide comprising a bell crank lever formed with a short arm and with a long handle arm pivoted on the guide top, a link connection extending between the said short arm and the plunger, and spring connections between the long arm and the guide designed to retain the lever in either its plunger lowering or raising position.

THOMAS REYNOLDS.